US012469351B2

(12) United States Patent
Sackfield

(10) Patent No.: US 12,469,351 B2
(45) Date of Patent: Nov. 11, 2025

(54) COIN ELEVATOR MECHANISM

(71) Applicant: Innovative Technology Limited, Oldham (GB)

(72) Inventor: Martin Sackfield, Oldham (GB)

(73) Assignee: Innovative Technology Limited, Oldham (GB)

( * ) Notice: Subject to any disclaimer, the term of this patent is extended or adjusted under 35 U.S.C. 154(b) by 704 days.

(21) Appl. No.: 17/781,179

(22) PCT Filed: Nov. 25, 2020

(86) PCT No.: PCT/EP2020/083414
§ 371 (c)(1),
(2) Date: May 31, 2022

(87) PCT Pub. No.: WO2021/121891
PCT Pub. Date: Jun. 24, 2021

(65) Prior Publication Data

US 2023/0005318 A1 Jan. 5, 2023

(30) Foreign Application Priority Data

Dec. 17, 2019 (GB) ...................................... 1918619

(51) Int. Cl.
*G07D 9/00* (2006.01)

(52) U.S. Cl.
CPC .................................... *G07D 9/008* (2013.01)

(58) Field of Classification Search
CPC ...................................................... G07D 9/008
See application file for complete search history.

(56) References Cited

U.S. PATENT DOCUMENTS 3,486,511 A 12/1969 Salvesen
3,722,653 A 3/1973 Hennessy
(Continued)

FOREIGN PATENT DOCUMENTS

CN 1264884 8/2000
CN 1981308 6/2007
(Continued)

OTHER PUBLICATIONS

English translation of Office Action in related CN2020800867725 dated Apr. 11, 2024.
Office Action from related Indian application 202217034621.

*Primary Examiner* — Kevin T Bates
*Assistant Examiner* — Poonam Sharma
(74) *Attorney, Agent, or Firm* — Woodard Emhardt Henry Reeves & Wagner LLP

(57) ABSTRACT

A coin elevator mechanism that includes a first housing wall and an opposing second housing wall, with a coin ingress aperture in the first housing wall and a coin egress aperture in the second housing wall positioned above the ingress aperture. A continuous articulated conveyor belt with multiple link members communicates between the ingress and egress apertures. At least one link member features a coin scoop projection that is inclined relative to a transverse axis of the link. As the conveyor belt operates, the coin scoop projection forms a coin pocket, delimited at its ends by the two housing walls, and is configured to carry multiple coins from the ingress aperture to the egress aperture. Coins are transported upward and discharged under the influence of gravity.

10 Claims, 6 Drawing Sheets

(56) References Cited

U.S. PATENT DOCUMENTS

| | | | | |
|---|---|---|---|---|
| 4,416,299 | A * | 11/1983 | Bergman ............... | G07D 9/008 198/549 |
| 6,328,646 | B1 * | 12/2001 | Abe ....................... | G07D 9/008 453/57 |
| 8,844,704 | B2 * | 9/2014 | Bell ......................... | G07D 3/14 453/56 |
| 2001/0014838 | A1 * | 8/2001 | Abe ....................... | G07D 9/008 700/226 |
| 2009/0229949 | A1 | 9/2009 | Nakamoto | |
| 2010/0227539 | A1 * | 9/2010 | Aguado Vitas .......... | G07D 1/00 221/253 |
| 2017/0206729 | A1 | 7/2017 | Blythin et al. | |
| 2019/0318565 | A1 * | 10/2019 | Atzinger ................... | G07F 1/04 |

FOREIGN PATENT DOCUMENTS

| | | | |
|---|---|---|---|
| CN | 106796741 | | 5/2017 |
| EP | 0080842 | | 7/1987 |
| EP | 1031948 | A2 | 8/2000 |
| EP | 1120754 | A1 | 8/2001 |
| EP | 2226769 | | 7/2011 |
| EP | 3559918 | | 10/2019 |
| GB | 1475900 | | 6/1977 |
| GB | 2528287 | A | 1/2016 |
| WO | WO 2006/003212 | A2 | 1/2006 |

* cited by examiner

COIN ELEVATOR MECHANISM

The present invention generally relates to a mechanism for transporting disc-shaped objects. More particularly, the present invention relates to an elevator mechanism for raising monetary coins from a lower level to an upper level within a host apparatus. A host apparatus may be a vending machine, an amusement or gaming machine, a change-giving machine, a point-of-sale terminal, or any other such machine that dispenses and/or accepts coins.

More particularly, the present invention is concerned with coin elevators that employ an endless belt or chain as the central conveyance mechanism for the transportation of coins.

GB 1,475,900 discloses a coin hopper in which pins protruding from a chain loop transport individual coins from a coin pickup region upwards to a deflector which diverts the coins into an exit passage.

EP 0 080 842 discloses a coin dispensing mechanism comprising an articulated continuous articulated conveyor belt of hingedly connected segments. Each segment includes an obliquely extending coin pick-up lip. The distance between adjacent lips is arranged such that only one coin is upwardly entrained by each belt segment during operation of the dispensing mechanism.

WO-A-2006/003,212 discloses a money item dispensing apparatus. Here, a conveyor loop formed from a single plastic moulding is employed. The conveyor loop comprises a plurality of rigid rectangular portions hingedly interconnected. Each rigid rectangular portion includes a raised lip portion disposed on an inner surface and a plurality of gear teeth disposed on an outer surface. The distance between neighbouring lip portions is arranged to be less than the sum of the diameters of two coins. In this way, only a single coin is entrained upwards to be ejected through a coin outlet.

EP 2,226,769 discloses a coin dispenser including an endless chain coin extractor. The chain comprises two series of links that are arranged in a flat configuration and alternatively interconnected. The interconnection of the two series of links form alternate coin recesses which transport a single coin in an orientation parallel to the plane defined by the chain coin extractor. Each coin is transported upwardly in a respective recess to a deflector gate which directs the coin to either a return channel or an outlet path.

A problem exits with the conventional coin apparatus described above in that each link adapted for coin extraction is configured to extract only a single coin from a bulk supply of coins. Additionally, prior art continuous articulated conveyor belt systems have a complicated construction, which leads to an increase in the cost of manufacture and an increase in the likelihood that jamming, or belt failure events will occur.

Typically, the internal space available for the accommodation of a coin transport mechanism within a host apparatus is limited. Consequently, there is an overriding design imperative to minimise the size of the coin transport mechanism whilst also maximising the efficiency of coin throughput. Coin mechanisms which only convey a single coin at a time are not maximising efficiency per unit of space occupied by the coin transport mechanism.

A further problem exists in that conventional coin mechanisms, such as those described in GB 1,475,900 and EP 2,226,769, require the inclusion of a deflector or diverter device to remove individual coins from the continuous articulated conveyor belt. This additional requirement adds to the complexity of the mechanism, and the use of such diverter devices leads to an increase in the frequency of coin jamming events and the occurrence of coin mechanism breakdown.

The present invention seeks to address the problems that exist with conventional coin elevator mechanisms.

According to an aspect of the present invention, there is provided a coin elevator mechanism as defined in claim 1.

Preferably, the coin scoop projection forms a coin pocket extending between the first housing wall and the second housing wall as the coin scoop projection travels between the coin ingress aperture to the coin egress aperture under operation of the continuous articulated conveyor belt. The coin pocket thus formed is inclined away from the first housing wall and towards the second housing wall.

Advantageously, the coin scoop projection is arranged to slope away from the coin ingress aperture when proximal to it, and the coin scoop projection is arranged to slope towards the coin egress aperture when proximal to the coin egress aperture.

The first housing wall and the second housing wall are substantially parallel to one another.

Preferably, the coin scoop projection is positioned in an inclined manner with respect to both the transverse and the longitudinal axes of the at least one link member, and the coin scoop projection includes a rim portion, said rim portion disposed at a position distal from the at least one link member from which the coin scoop projection extends, and said rim portion extends at an angle to the longitudinal axis of the at least one link member.

In a preferred embodiment, a plurality of link members of the coin elevator mechanism includes a coin scoop projection.

Advantageously, the first housing wall and the second housing wall delimit and form a coin transport chamber, and the coin elevator mechanism includes a coin receptacle communicating with said coin ingress aperture.

In operation, coins transported from the ingress aperture are outputted via the egress aperture under the action of gravity.

An embodiment of the present invention will now be described, by way of example only, with reference to the accompanying drawings, in which.

Figure 1:
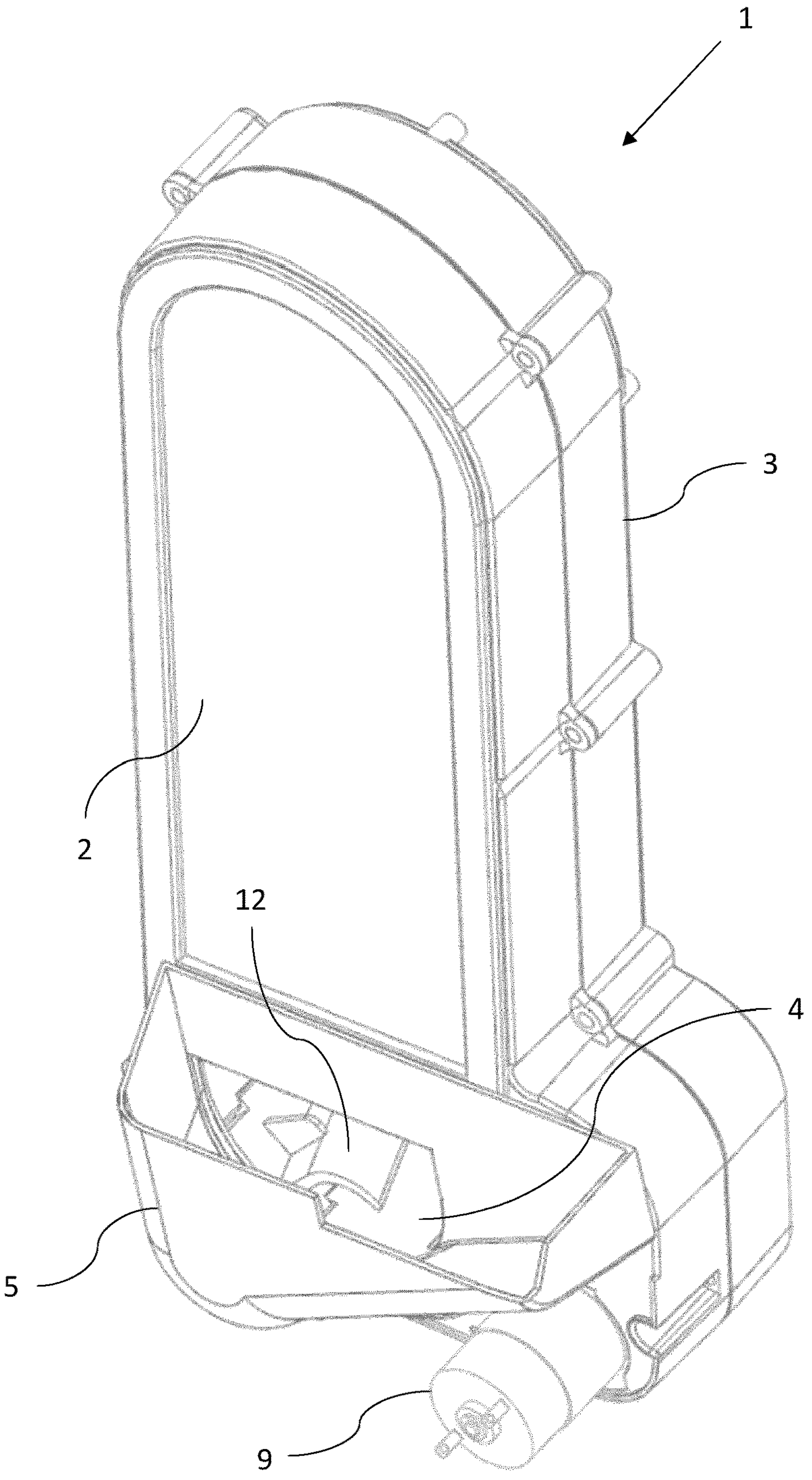
FIG. 1 is a perspective view of the coin elevator mechanism of the present invention.

With reference to FIGS. 1 to 5, a coin elevator mechanism 1 comprises a first housing wall 2, a second housing wall 3, a coin receptacle 5 communicating with a coin ingress aperture 4, and a drive motor 9.

The first housing wall 2 and the second housing wall 3 combine to form a mechanism housing enclosing a continuous articulated conveyor belt 7.

The continuous articulated conveyor belt 7 comprises a plurality of interconnected link members 8. Several of the link members 8 include a scoop projection 12. The continuous articulated conveyor belt 7 of link members 8 forms a coin paternoster. The figures show a continuous articulated conveyor belt 7 that includes six link members 8 with a coin scoop projection 12. However, the reader should be aware that the continuous articulated conveyor belt may comprises any number of coin scoop projections 12 depending on the given situation and operating requirements of the coin elevator mechanism 1.

In operation, the continuous articulated conveyor belt 7 is driven by the motor 9 via motor drive cog 9' and drive transfer cog 10. A succession of belt drive teeth 11 are located on the outer peripheral surface of each link member 8.

The drive transfer cog 10 engages with successive belt drive teeth 11 to drive the continuous articulated conveyor belt 7 in a clockwise direction.

Each coin scoop projection 12 extends from a respective link member 8 in a plane that is inclined to the plane defined by the link member 8.

The coin scoop projection 12 extends obliquely at an angle to the transverse axis of the respective link member 8. In operation, the coin scoop projection 12 travels in clockwise direction from a position adjacent to the coin ingress aperture 4 [see FIG. 2] to a position adjacent to the coin egress aperture 6 [see FIG. 3].

Figure 2:
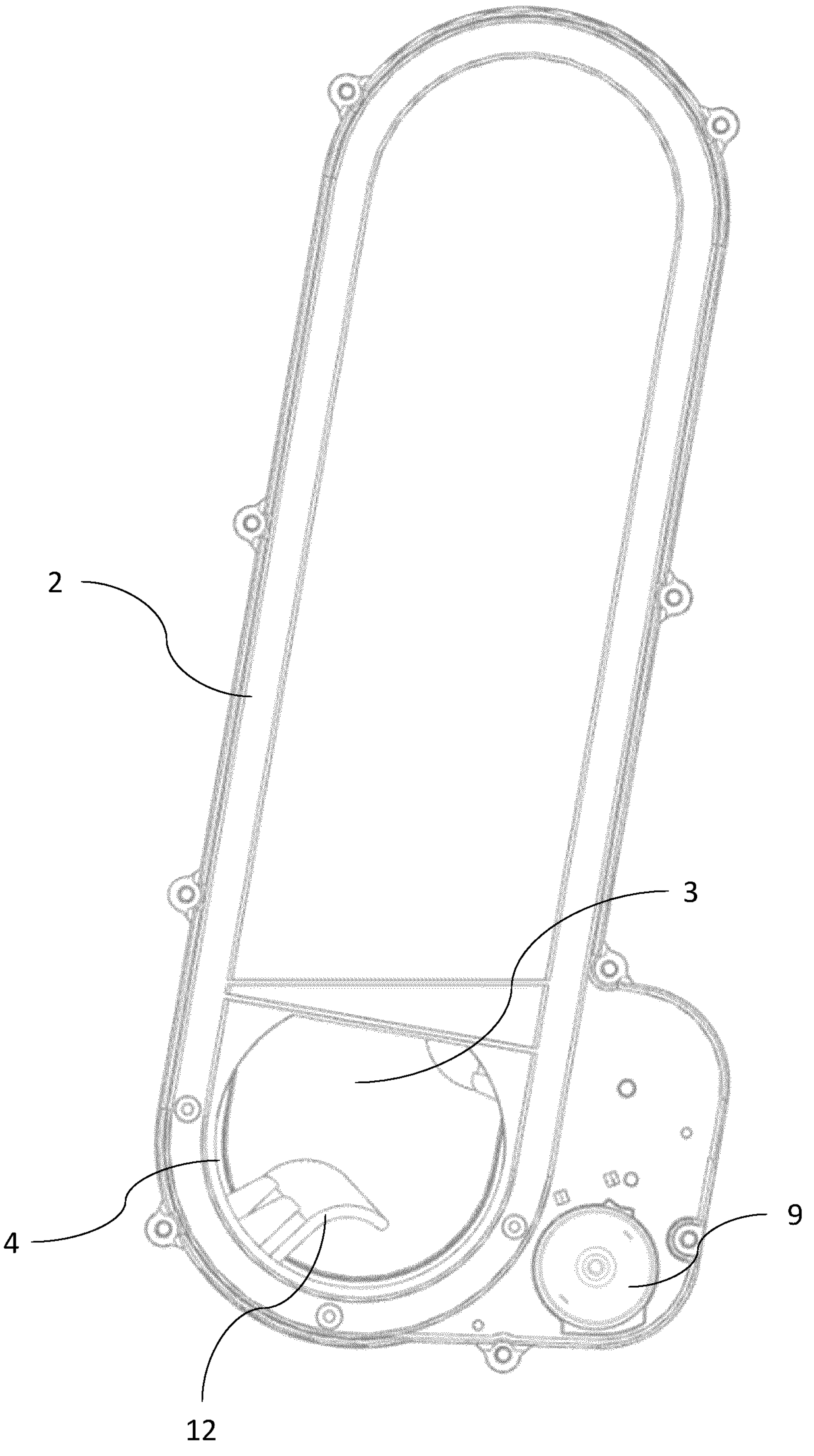
FIG. 2 is a side elevation view of the left-hand side of the coin elevator mechanism of FIG. 1.
Figure 3:
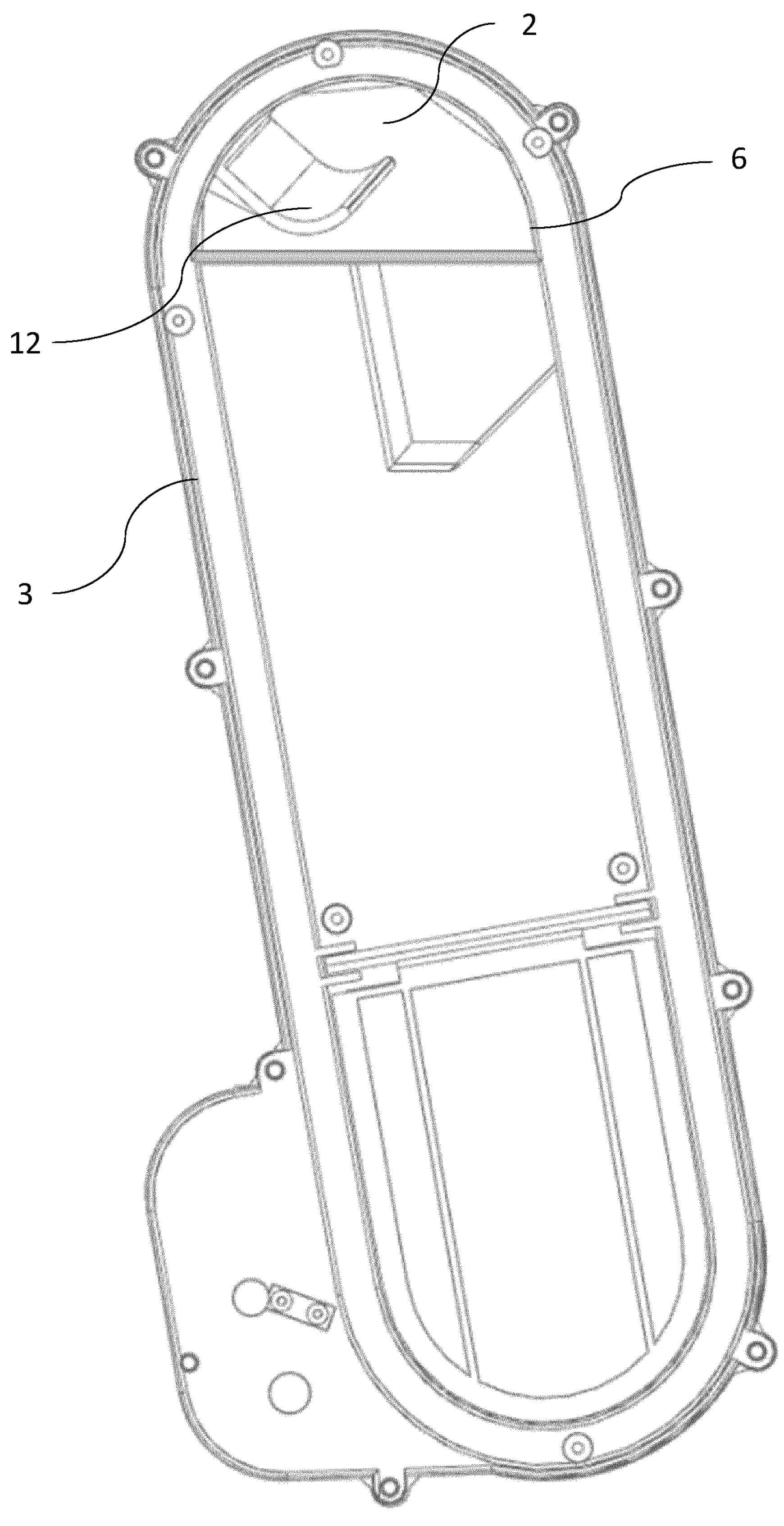
FIG. 3 is a side elevation view of the right-hand side of the coin elevator mechanism of FIG. 1.
Figure 4:
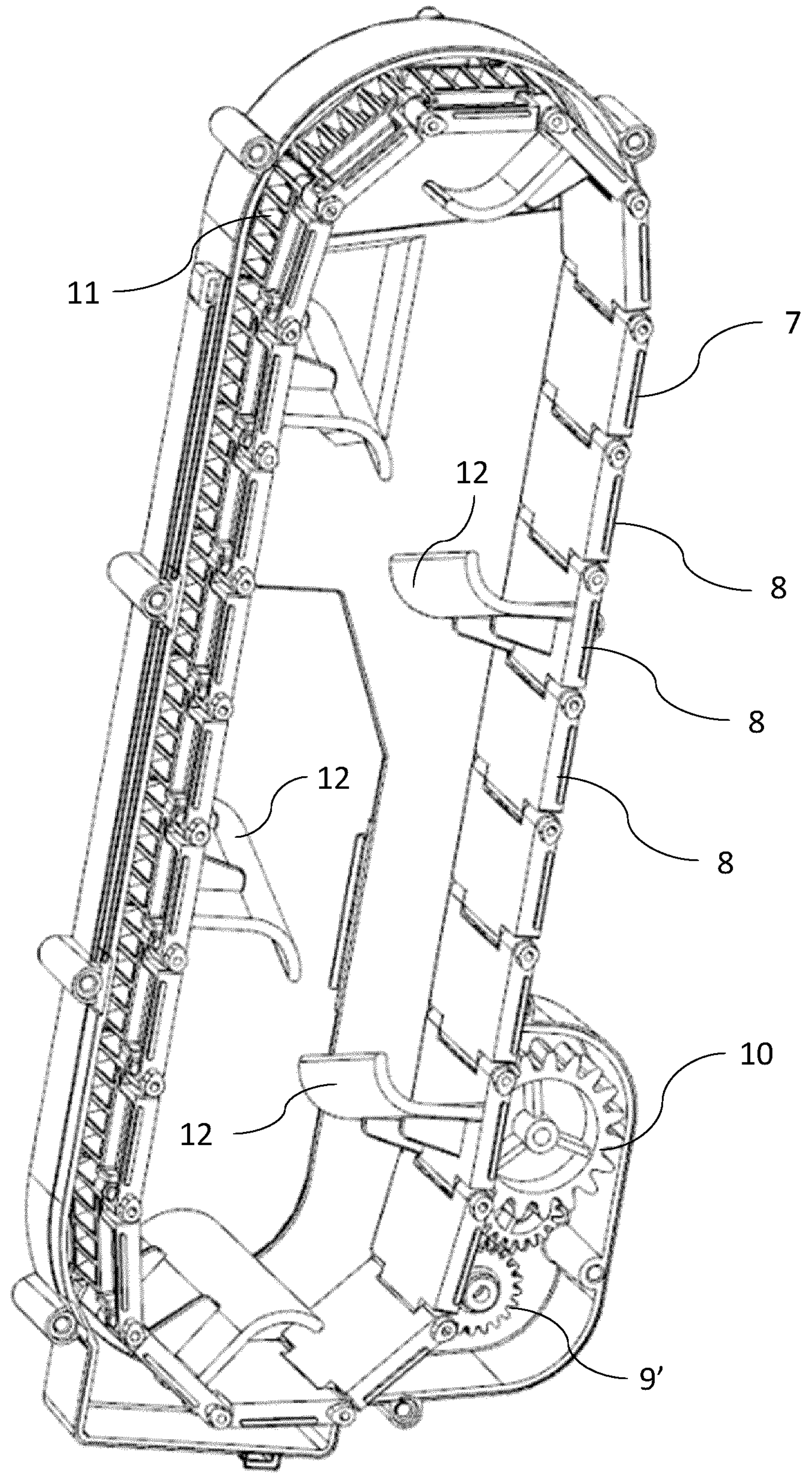
FIG. 4 is a perspective view of the coin elevator mechanism with a first housing wall removed.
Figure 5:
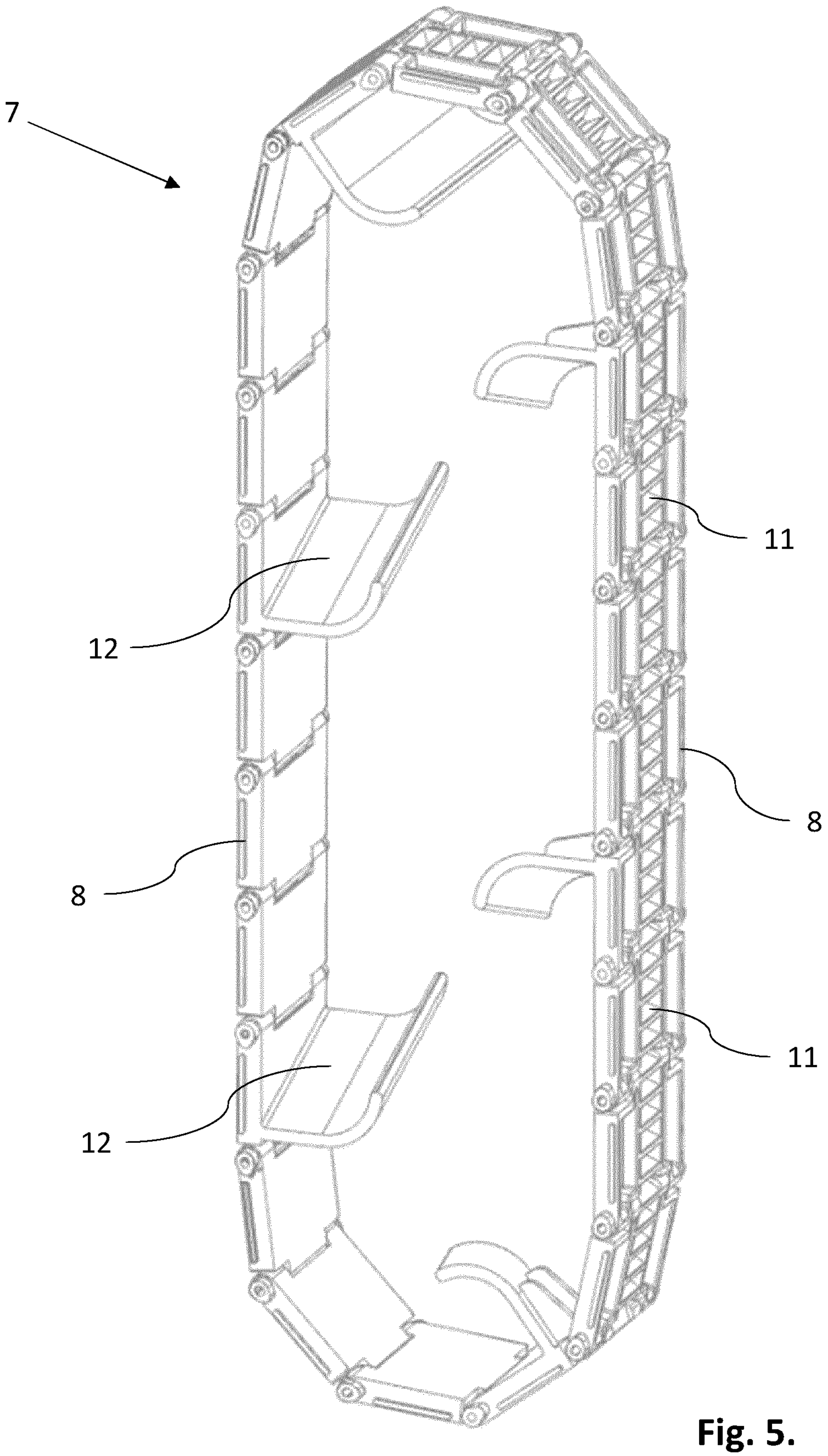
FIG. 5 is a perspective view showing the continuous articulated conveyor belt of the coin elevator mechanism in isolation.

In the position shown in FIG. 2, the coin scoop projection 12 is inclined away from the coin ingress aperture 4 and towards the second housing wall 3. In the position shown in FIG. 3, the coin scoop projection 12 is inclined towards the coin egress aperture 6 and away from the first housing wall 2.

In operation, as the coin scoop projection 12 is transported between the coin ingress aperture 4 and the coin egress aperture 6, it forms with the first housing wall 2 and the second housing wall 3 a coin pocket extending between the first housing wall 2 and the second housing wall 3. The coin pocket forms a sloping channel that is inclined away from the first housing wall 2 and is inclined towards the second housing wall 3.

A bulk supply of randomly orientated coins enters the coin receptacle 5 and fall under gravity towards the coin ingress aperture 4. As the coins move through the coin ingress aperture 4, they are swept up by a passing coin scoop projection 12 and transported upwards in a clockwise manner towards the coin egress aperture 6. The number of coins carried by a coin scoop projection 12 on each pass of the ingress aperture will depend on the throughput rate of the incoming supply of coins and the speed at which the continuous articulated conveyor belt 7 is being driven at the time. However, in any given operating condition the coin scoop projection 12 will capture a plurality of randomly orientated coins and transport them to the coin egress aperture.

Figure 6:
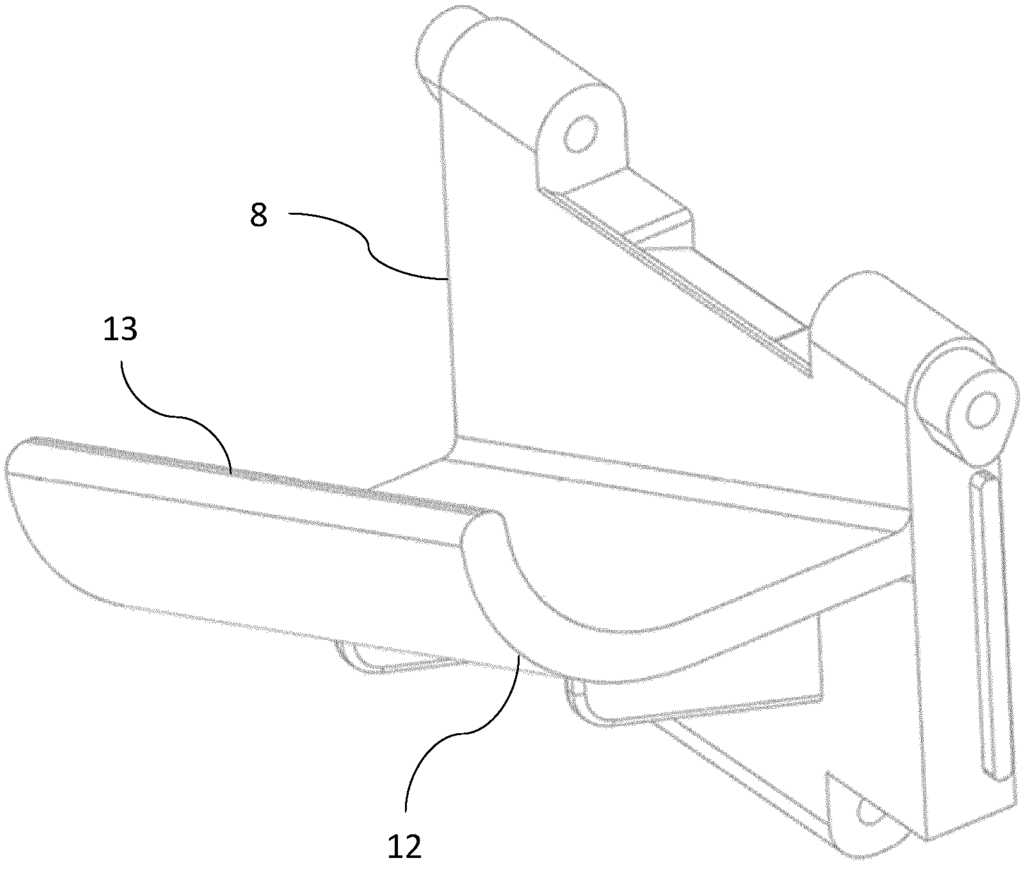
FIG. 6 is a perspective view of a link member of the continuous articulated conveyor belt.

With reference to FIG. 6, a coin scoop projection 12 extends away from a respective link member 8 in a substantially orthogonal manner and forms an upwardly inclined lip portion 13. The curved lip portion 13 extends in a substantially orthogonal direction to the plane defined by the coin scoop projection 12, and it extends in a substantially parallel direction to the plane defined by the respective link member 8.

The coin scoop projection 12 is inclined with respect to the transverse axis of the link member 6, and the lip portion 13 extends in a direction parallel to that of the respective coin scoop projection 12. The lip portion 13 projects upwardly out of the plane defined by the scoop projection 12.

In operation, a coin pocket is formed that is delimited at its transverse extremities by the first housing wall 2 and the second housing wall 3 [not shown]. In a longitudinal direction, the coin pocket is delimited by the upper surface of the coin scoop projection 12 and the respective lip portion 13. The coin pocket defined in this way forms a bucket-like cavity configured to entrain and transport coins in an upward direction when the continuous articulated conveyor belt is driven by the motor 9 in a clockwise direction.

Although not shown, the coin elevator mechanism includes two sensor arrangements. A first sensor is located proximal to the coin ingress aperture 4 and consists of a magnetic inductance sensor configured to detect the movement of coins within the vicinity of the coin ingress aperture 4. At the end of a lifting operation, if the sensor detects the presence of coins in the vicinity of the coin ingress aperture 4, the motor 9 will reverse for a short period of time to ensure any stray coins are collected in the lower extremity of the mechanism proximal to the aperture 4. The motor 9 then drives the belt upwards to ensure that all stray coins are ejected from the coin egress aperture.

A second sensor is disposed proximal to the coin egress aperture 6. This sensor is an optical sensor configured to detect coin overflow events. When the light path of the optical sensor is blocked for more than a second, the motor 9 is switched off to prevent coin overload.

Advantageously, the coin elevator mechanism of the present invention provides a mechanism that is adapted to lift a plurality of randomly orientated coins at the same time. The mechanism does not require a diverter or other such device to remove the coins from the elevator mechanism; coins exit the mechanism via the egress aperture under the influence of gravity only.

The invention claimed is:

1. A coin elevator mechanism comprising:

a first housing wall and an opposing second housing wall;

a coin ingress aperture;

a coin egress aperture positioned above said coin ingress aperture; and a continuous articulated conveyor belt including a plurality of link members, the continuous articulated conveyor belt is arranged to provide communication between said coin ingress aperture and said coin egress aperture;

characterised in that the coin ingress aperture is located in the first housing wall and the coin egress aperture is located in the second housing wall, and in that at least one of the plurality of link members includes a coin scoop projection extending therefrom and inclined with respect to a transverse axis of the at least one link member, wherein said coin scoop projection forms a coin pocket extending between, and delimited at its transverse extremities, by the first housing wall and the second housing wall as the coin scoop projection travels between the coin ingress aperture to the coin egress aperture under operation of the continuous articulated conveyor belt, and is configured to entrain a plurality of coins input via the coin ingress aperture from the coin ingress aperture to the coin egress aperture.

2. A coin elevator mechanism as claimed in claim 1, wherein the coin pocket thus formed is inclined away from the first housing wall and towards the second housing wall.

3. A coin elevator mechanism as claimed in claim 1, wherein the coin scoop projection is arranged to slope away from the coin ingress aperture when proximal to it, and said coin scoop projection is arranged to slope towards the coin egress aperture when proximal to said coin egress aperture.

4. A coin elevator mechanism as claimed in claim 1, wherein the first housing wall and the second housing wall are substantially parallel to one another.

5. A coin elevator mechanism as claimed in claim 1, wherein the coin scoop projection is positioned in an inclined manner with respect to both the transverse and the longitudinal axes of the at least one link member.

6. A coin elevator mechanism as claimed in claim 1, wherein the coin scoop projection includes a rim portion, said rim portion disposed at a position distal from the at least one link member from which the coin scoop projection extends, and said rim portion extends at an angle to the longitudinal axis of the at least one link member.

7. A coin elevator mechanism as claimed in claim 1, wherein a plurality of link members includes a coin scoop projection.

8. A coin elevator mechanism as claimed in claim 1, wherein the first housing wall and the second housing wall delimit and form a coin transport chamber.

9. A coin elevator mechanism as claimed in claim 1, wherein the coin elevator mechanism includes a coin receptacle communicating with said coin ingress aperture.

10. A coin elevator mechanism as claimed in claim 1, wherein coins transported from the coin ingress aperture are outputted via the coin egress aperture under the action of gravity.

* * * * *